United States Patent
Monbaliu

(10) Patent No.: US 11,667,168 B2
(45) Date of Patent: Jun. 6, 2023

(54) AXLE ARRANGEMENT FOR AN AGRICULTURAL BALER

(71) Applicant: CNH Industrial America LLC, New Holland, PA (US)

(72) Inventor: Sven Monbaliu, Zuienkerke (BE)

(73) Assignee: CNH Industrial America LLC, New Holland, PA (US)

( * ) Notice: Subject to any disclaimer, the term of this patent is extended or adjusted under 35 U.S.C. 154(b) by 70 days.

(21) Appl. No.: 17/253,310

(22) PCT Filed: Jun. 19, 2019

(86) PCT No.: PCT/EP2019/066302
§ 371 (c)(1),
(2) Date: Dec. 17, 2020

(87) PCT Pub. No.: WO2019/243476
PCT Pub. Date: Dec. 26, 2019

(65) Prior Publication Data
US 2021/0268855 A1    Sep. 2, 2021

(30) Foreign Application Priority Data

Jun. 20, 2018   (BE) .................................. 2018/5423

(51) Int. Cl.
| | | |
|---|---|---|
| *B60G 9/00* | (2006.01) | |
| *A01D 89/00* | (2006.01) | |
| *A01F 15/12* | (2006.01) | |
| *B60G 11/34* | (2006.01) | |
| *B62D 21/02* | (2006.01) | |
| *A01F 15/04* | (2006.01) | |

(52) U.S. Cl.
CPC ........... B60G 9/003 (2013.01); A01D 89/002 (2013.01); A01F 15/12 (2013.01); B60G 11/34 (2013.01);
(Continued)

(58) Field of Classification Search
CPC ........ B60G 9/003; B60G 9/027; B60G 11/34; B60G 11/46; B60G 2200/31;
(Continued)

(56) References Cited

U.S. PATENT DOCUMENTS 2,270,022 A * 1/1942 Price ...................... B60G 5/047
267/230
5,308,105 A * 5/1994 Fujan ....................... B60G 5/00
180/24.01
(Continued)

FOREIGN PATENT DOCUMENTS

EP       0494286 B1 *  7/1991
EP       1618779 A1     7/2005
(Continued)

OTHER PUBLICATIONS

PCT International Search Report for PCT application PCT/EP2019/066302, dated Aug. 21, 2019 (12 pages).

*Primary Examiner* — Karen Beck
*Assistant Examiner* — Scott F. Underwood
(74) *Attorney, Agent, or Firm* — Peter K. Zacharias

(57) ABSTRACT

An axle arrangement for a baler having a chassis includes a first axle having opposite ends and a pair of suspension cylinders, with each suspension cylinder positioned at a corresponding end of the first axle to accommodate generally vertical loads. The first axle is coupled with the chassis to accommodate generally horizontal loads. A second axle has opposite ends and a pair of suspension cylinders, with each suspension cylinder positioned at a corresponding end of the second axle to accommodate generally vertical loads. The second axle is coupled with the first axle to accommodate generally horizontal loads.

8 Claims, 7 Drawing Sheets

(52) U.S. Cl.
CPC .............. *B62D 21/02* (2013.01); *A01F 15/04* (2013.01); *B60G 2200/31* (2013.01); *B60G 2204/81* (2013.01); *B60G 2204/8302* (2013.01); *B60G 2300/04* (2013.01); *B60G 2300/08* (2013.01)

(58) Field of Classification Search
CPC ............ B60G 2300/04; B60G 2300/08; B60G 2200/324; B60G 2200/34; B60G 5/047; A01D 89/002; A01F 15/12; A01F 15/08; B62D 21/02
See application file for complete search history.

(56) References Cited

U.S. PATENT DOCUMENTS

| | | | |
|---|---|---|---|
| 5,944,339 A * | 8/1999 | McKenzie | B60G 5/04 280/683 |
| 7,866,680 B2 | 1/2011 | Baldauf et al. | |
| 2005/0263986 A1* | 12/2005 | Miller | B60G 11/465 280/683 |
| 2008/0023929 A1* | 1/2008 | Ryberg | F16F 9/306 280/124.166 |
| 2009/0199603 A1 | 8/2009 | Baldauf et al. | |
| 2012/0313342 A1* | 12/2012 | Ramsey | B62D 21/11 280/124.157 |
| 2018/0272825 A1* | 9/2018 | Eagleton | B62D 21/02 |
| 2020/0017152 A1* | 1/2020 | Ishikawa | B62D 57/02 |

FOREIGN PATENT DOCUMENTS

| | | |
|---|---|---|
| FR | 2132131 A1 | 11/1972 |
| FR | 2764770 A1 | 12/1998 |
| GB | 2016388 A | 9/1979 |
| GB | 2254056 A | 9/1992 |
| WO | 02/47926 A1 | 6/2002 |

* cited by examiner

AXLE ARRANGEMENT FOR AN AGRICULTURAL BALER

BACKGROUND OF THE INVENTION

1. Field of the Invention

The present invention relates to agricultural balers, and, more particularly, to axle arrangements used with such balers.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a feeding channel (also known as a "pre-compression chamber"). The packer unit forms a wad of crop within the feeding channel which is then transferred to a main bale chamber. (For purposes of discussion, the charge of crop material within the feeding channel will be termed a "wad", and the charge of crop material after being compressed within the main bale chamber will be termed a "flake"). Typically such a packer unit includes packer tines or forks to move the crop material from the pickup unit into the feeding channel. Instead of a packer unit it is also known to use a rotor cutter unit which chops the crop material into smaller pieces.

A stuffer unit transfers the wad of crop material in charges from the feeding channel to the main bale chamber. Typically such a stuffer unit includes stuffer forks which are used to move the wad of crop material from the feeding channel to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Large square balers typically include tandem axles to support the weight of the baler and the bales within the baler. The tandem axles are usually coupled to the chassis of the baler by way of an inverted "Y" or yoke arrangement at the ends of the axles, with the apex of the yoke being pivotally coupled to the chassis of the baler. This mechanical interconnection between the axles allows the axles to move together as the baler traverses over uneven ground. These types of tandem axle arrangements can also be called a "bogie".

For some baler arrangements, an axle suspension system as described above with an inverted yoke arrangement may not be possible or desirable. Moreover, a needle arrangement which is used to feed twine through a formed bale typically includes a needle yoke which moves along a travel path below the baler and potentially can interfere with the configuration of the front and rear axles. With a needle yoke positioned at the bottom of a baler, an inverted Y or bogie design tandem axle arrangement may not be feasible.

What is needed in the art is an axle arrangement that does not interfere with a needle arrangement positioned at the bottom of an agricultural baler.

SUMMARY OF THE INVENTION

The present invention provides an agricultural baler with an axle arrangement with suspension cylinders, in which the first axle is connected to the chassis, and the second axle is connected to the first axle, thereby allowing the axle arrangement to be positioned below a needle arrangement at the bottom of the baler.

The invention in one embodiment is directed to an agricultural baler including a chassis, a main bale chamber carried by the chassis, and an axle arrangement coupled with the chassis. The axle arrangement includes a first axle and a second axle. The first axle has opposite ends and a pair of suspension cylinders, with each suspension cylinder positioned at a corresponding end of the first axle to accommodate generally vertical loads. The first axle is coupled with the chassis to accommodate generally horizontal loads. The second axle has opposite ends and a pair of suspension cylinders, with each suspension cylinder positioned at a corresponding end of the second axle to accommodate generally vertical loads. The second axle is coupled with the first axle to accommodate generally horizontal loads.

In another embodiment of the invention, at least one elongate member interconnects the second axle with the first axle.

In another embodiment of the invention, the at least one elongate member includes a tube extending between the second axle and the first axle. A pair of angled braces extend from the tube toward a respective end of the second axle, thereby forming a generally triangular shaped reinforcement structure.

In another embodiment of the invention, the baler includes a needle yoke which pivots during operation along an arcuate travel path under the baler, and the at least one elongate member is positioned below the travel path of the needle yoke.

In another embodiment of the invention, the second axle is coupled with the first axle via a ball joint.

In yet another embodiment of the invention, the ball joint has a generally vertical (or horizontal) pivot axis.

In yet another embodiment of the invention, a lateral stabilization member interconnects between the second axle and the chassis.

In a further embodiment of the invention, the lateral stabilization member is a rod which is pivotally coupled with the second axle and the chassis.

In a further embodiment of the invention, the baler includes a pickup unit and a feeding channel for receiving crop from the pickup unit. The first axle includes a first leaf spring and a second leaf spring positioned at the respective opposite ends of the first axle. The feeding channel defines a structural member which is coupled with the chassis. The first leaf spring and the second leaf spring are pivotally coupled with the feeding channel, and thereby indirectly coupled to the chassis by way of the feeding channel.

In a further embodiment of the invention, the first axle is mounted rearwardly of the feeding channel, thereby lowering an effective axle height of the axle arrangement.

In a yet still further embodiment of the invention, each leaf spring is a generally horizontally arranged leaf spring.

In a yet still further embodiment of the invention, each of the leaf springs provide lateral stabilization of the first axle.

In another embodiment of the invention, the axle arrangement has at least two axles (two, three, four, etc.), including the first axle and the second axle.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates an embodiment of the invention, and such exemplification is not to be construed as limiting the scope of the invention in any manner.

DETAILED DESCRIPTION OF THE INVENTION

Figure 1:
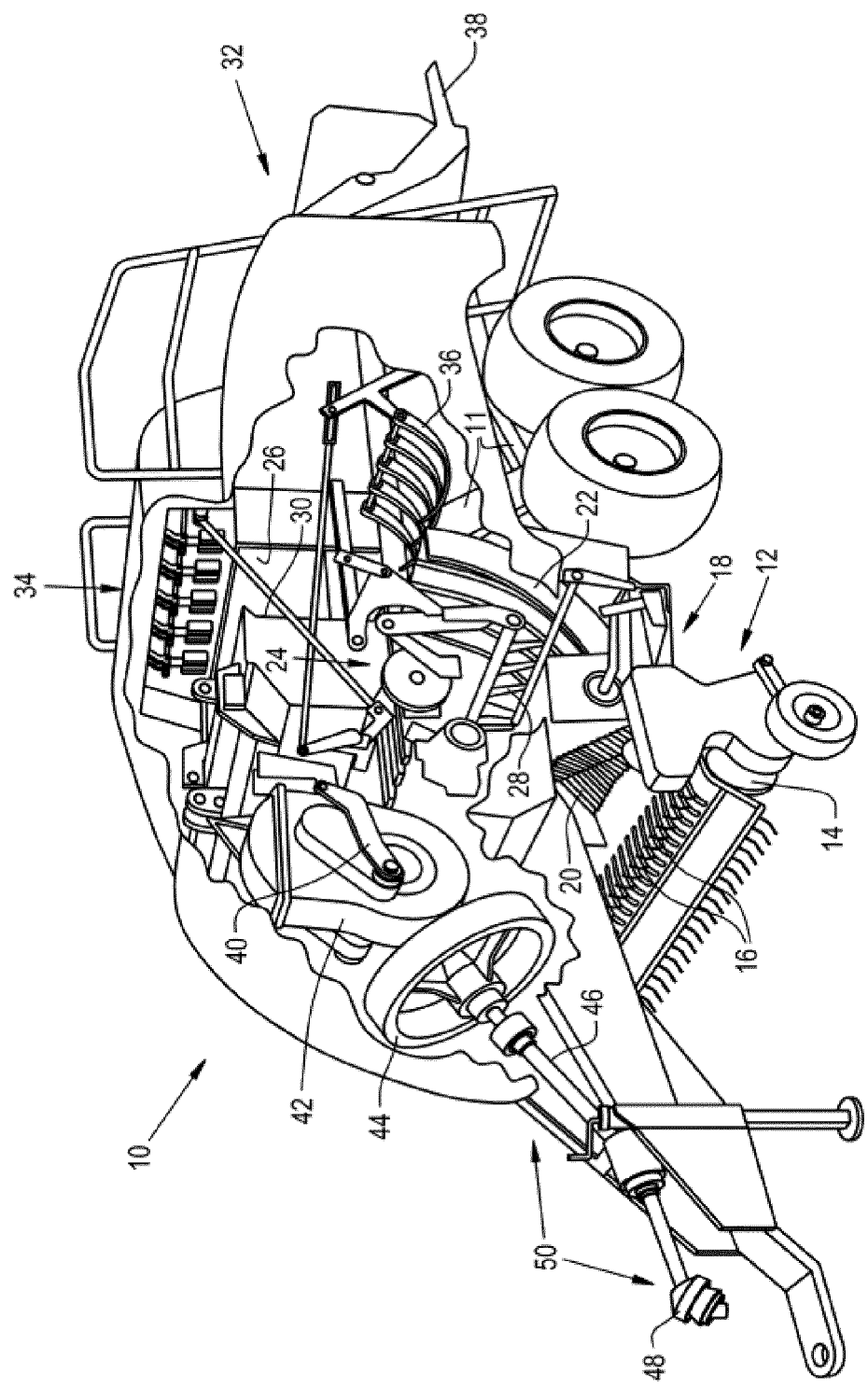
FIG. 1 is a perspective cutaway view showing the internal workings of a large square baler, which can include an axle arrangement of the present invention.
Figure 2:
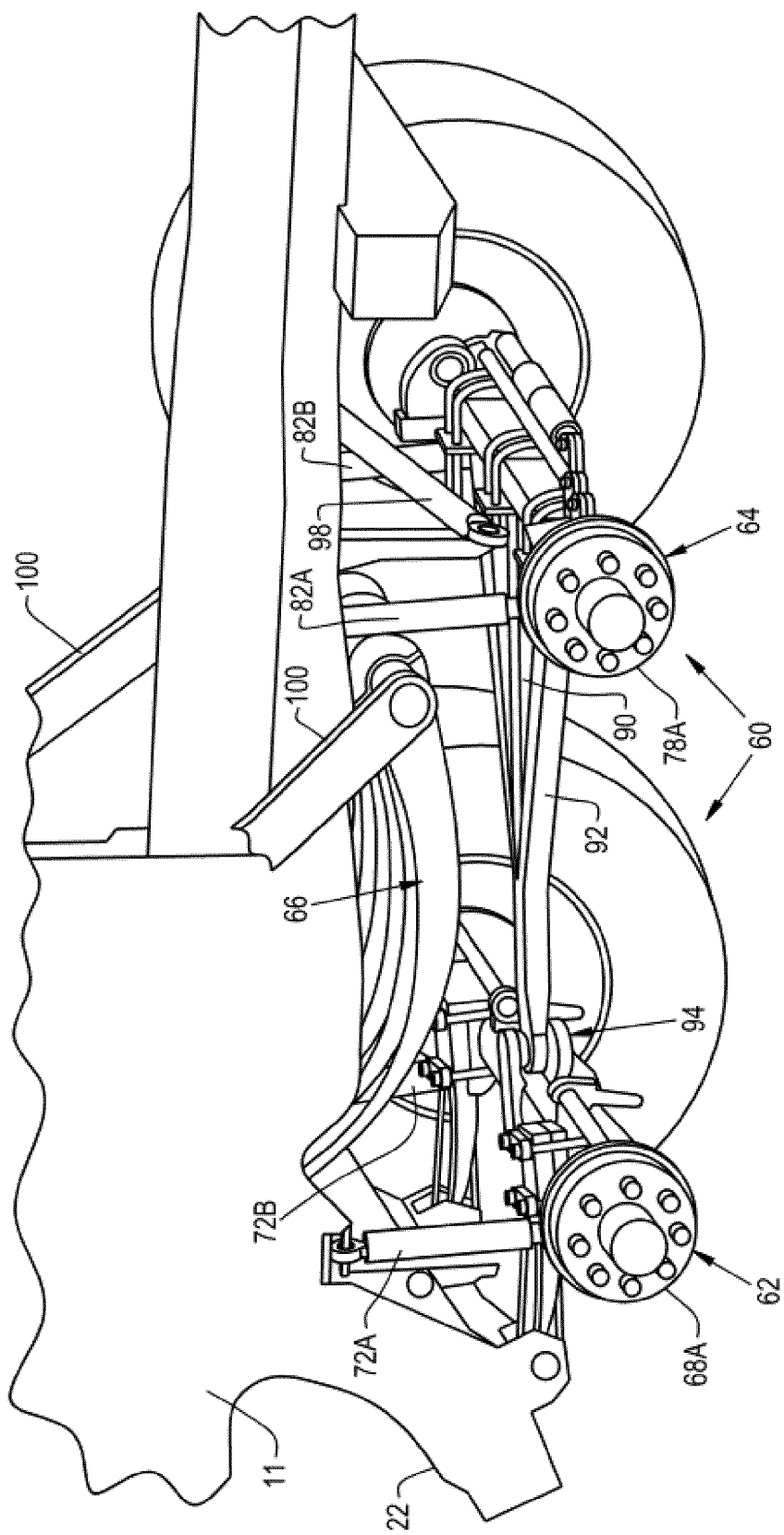
FIG. 2 is a perspective view of a portion of the baler shown in FIG. 1, including an embodiment of the axle arrangement of the present invention.
Figure 3:
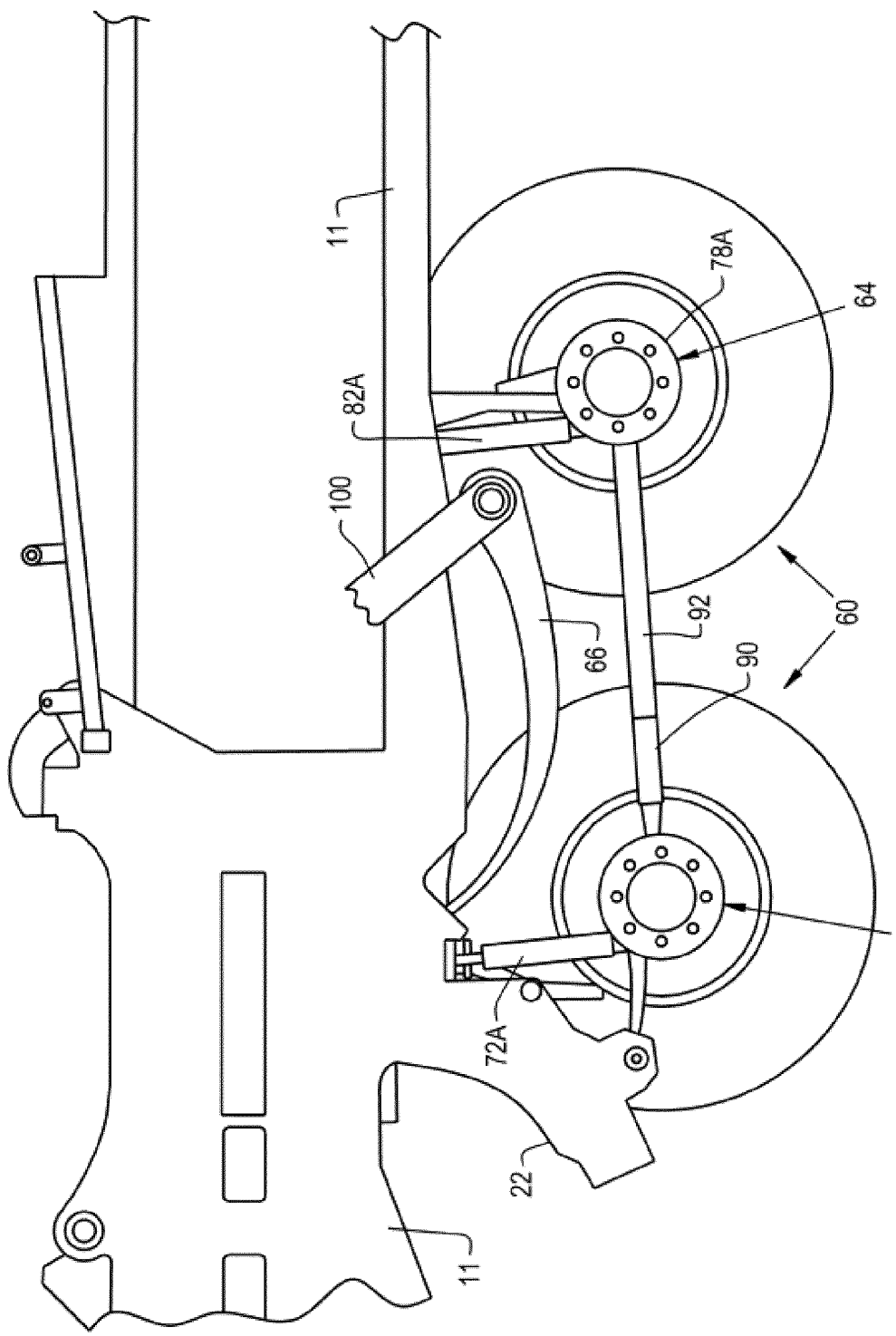
FIG. 3 is a side view of the portion of the baler shown in FIG. 2.

Referring now to the drawings, and more particularly to FIG. 1, there is shown a perspective cutaway view showing the internal workings of a large square baler 10. Baler 10 includes a chassis 11 carrying a number of baler components (described below), and operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a feeding channel 22 to form a wad of crop material. The packer tines 20 intertwine the crop together and pack the crop within the feeding channel 22. Feeding channel 22 and packer tines 20 function as the first stage for crop compression. Once the pressure in the feeding channel 22 reaches a predetermined sensed value, a stuffer unit 24 moves the wad of crop from the feeding channel 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). PTO coupler 48, drive shaft 46 and flywheel 44 together define a portion of a driveline 50 which provides rotative power to gearbox 42. Flywheel 44 has a sufficient mass to carry plunger 30 through a compression stroke as power is applied to drive shaft 46 by the traction unit.

According to an aspect of the present invention, and referring now to FIGS. 2-7, the agricultural baler 10 includes an axle arrangement 60 having a first axle 62 and a second axle 64. The first axle 62 is connected to the chassis 11, and the second axle 64 is connected to the first axle 62, thereby allowing the axle arrangement 60 to be positioned below a needle arrangement 66 at the bottom of the baler 10.

More particularly, the first axle 62 has opposite ends 68A and 68B, with a pair of leaf springs 70A and 70B, and a pair of suspension cylinders 72A and 72B, positioned at each respective end. The generally vertically arranged suspension cylinders 72A and 72B accommodate generally vertical loads, such as the weight of the bale(s) and the dynamic vertical loads as the baler 10 traverses over the ground.

The first axle 62 is also coupled with the chassis 11 to accommodate generally horizontal loads. In the illustrated embodiment, the first end 68A is coupled with the chassis 11 by the first leaf spring 70A, and the second end 68B is coupled with the chassis 11 by the second leaf spring 70B. This interconnection between the first axle 62 and the chassis 11 can be direct or indirect.

For example, in one embodiment, the feeding channel 22 can define a structural member which is coupled with the chassis 11. This is in contrast with conventional designs, wherein the feeding channel 22 is a non-structural component made of light metal which directs the crop into the main bale chamber 26. The leaf spring 70A and 70B are pivotally coupled with the feeding channel 22 (FIGS. 2-4), and thereby indirectly coupled to the chassis 11 by way of the feeding channel 22. The first axle 62 can be mounted rearwardly of the feeding channel 22, thereby lowering an effective axle height of the axle arrangement 60.

In the embodiment of the invention shown in the drawings, the leaf springs 70A and 70B are generally horizontally arranged leaf springs. It may be possible in other applications, however, to arrange the leaf springs other than horizontally. Moreover, in the embodiment of the invention shown in the drawings, each of the leaf springs 70A and 70B provide lateral stabilization of the first axle 62. It may be possible in other applications, however, to provide the lateral support with other structure, such as a tie rod extending between the chassis 11 and the first axle 62, or other structure providing lateral support.

The second axle 64 has opposite ends 78A and 78B, with a pair of suspension cylinders 82A and 82B, positioned at each respective end. The generally vertically arranged suspension cylinders 82A and 82B accommodate generally vertical loads, such as the weight of the bale(s) and the dynamic vertical loads as the baler 10 traverses over the ground.

The needle arrangement 66 can interfere with the attachment of the second axle 64 to the chassis 11 in order to accommodate horizontal loads. An inverted Y yoke or bogie arrangement at the outboard ends of the second axle 64 may not be possible or feasible. Accordingly, the second axle 64 can be coupled with the first axle 62 to accommodate generally horizontal loads.

In one embodiment of the invention, at least one elongate member 90 interconnects the second axle 64 with the first axle 62. The at least one elongate member 90 can be, e.g., in the form of a tube extending between the second axle 64 and the first axle 62. The tube can be formed as a rectangular tube (as shown), or can have some other desired cross-sectional shape such as round, triangular, etc. Moreover, the tube can be hollow or solid.

A pair of angled braces 92 can extend from the tube 90 toward a respective end 78A or 78B of the second axle 64, thereby forming a generally triangular shaped reinforcement structure. The angled braces 92 support the outboard ends 78A and 78B of the second axle 64, and other types or shapes of support or reinforcement structures may also be possible. The interconnection between the angled braces 92 and the second axle 64 and/or elongate member 90 can vary, such as a bolted connection, welded connection, ball joints, etc.

The elongate member 90 can include a forward end that is coupled with the first axle 62 via a movable connection such as a ball joint 94. The ball joint 94 can include a generally vertical (or horizontal) pivot axis 96 and allows both vertical and horizontal movement between the first and second axles 62 and 64.

Because of the way in which the second axle 64 is coupled with the chassis by way of the suspension cylinders 82A, 82B and the at least one elongate member 90, it may be desirable to laterally support or stabilize the second axle 64. For example, a lateral stabilization member 98 can interconnect between the second axle 64 and the chassis 11. The lateral stabilization member 98 can be configured as a rod which is pivotally coupled with the second axle 64 and the chassis 11 (such as with a ball joint, bolt with bushing, etc.). Alternatively, the lateral stabilization could be provided differently, such as a fluid cylinder, spring(s), etc. In the case of a cylinder, the cylinder could also be used to provide the added functionality of moving the axle from side to side, etc.

Figure 4:
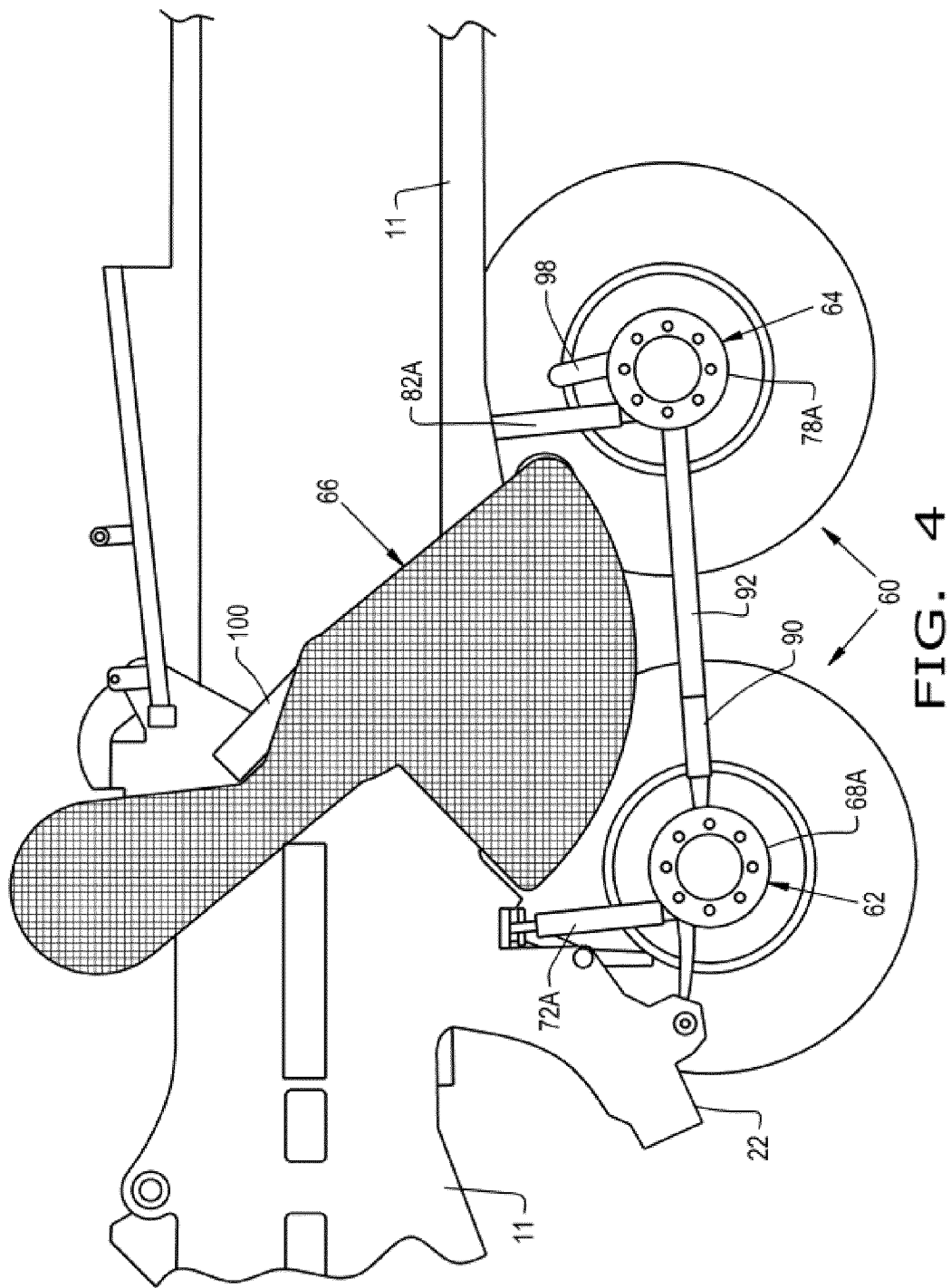
FIG. 4 is another side view of the portion of the baler shown in FIGS. 2 and 3, illustrating the travel path of the needle yoke during operation.
Figure 5:
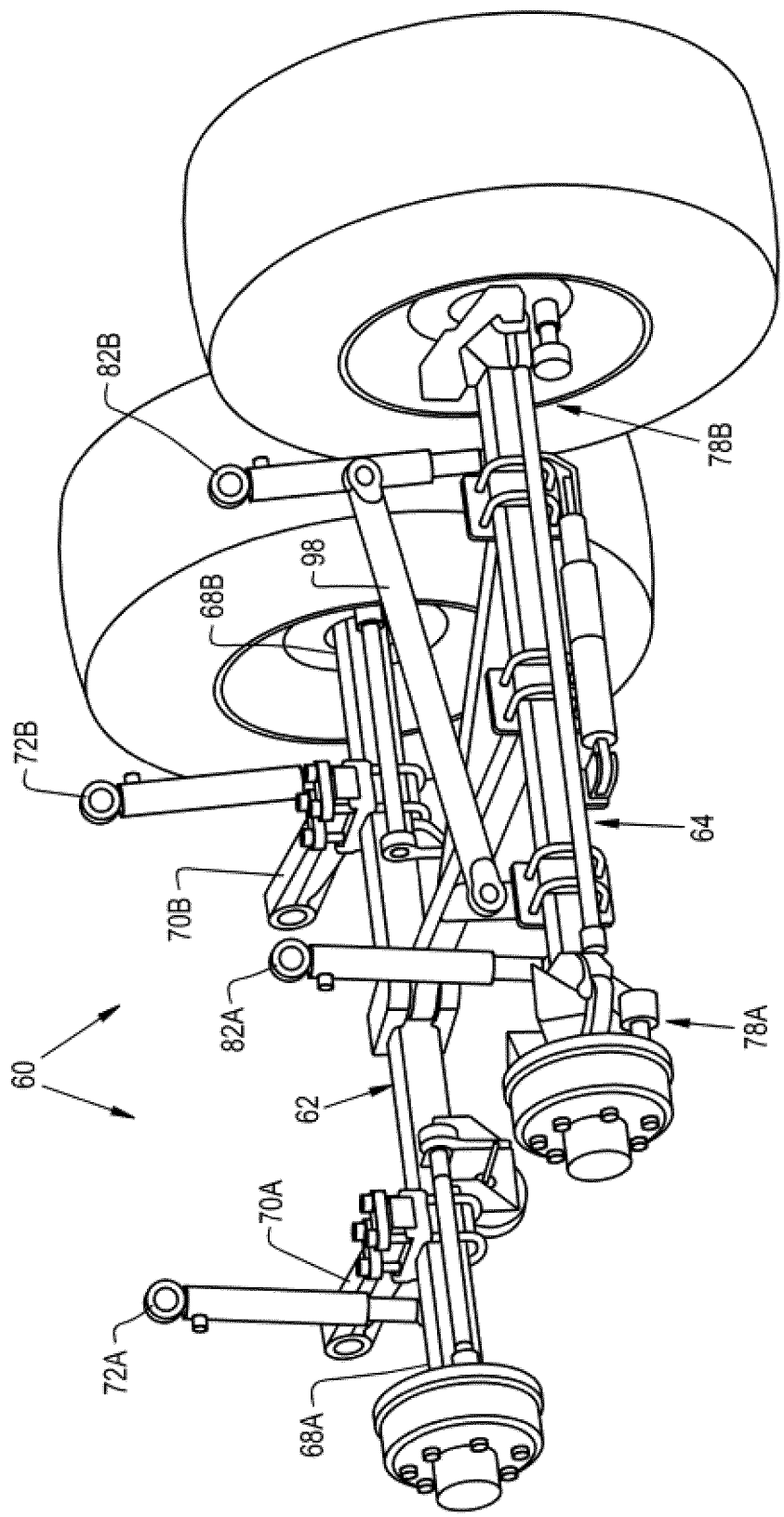
FIG. 5 is a perspective view of the axle arrangement shown in FIGS. 1-4, with the wheels removed on one side for ease of illustration.
Figure 6:
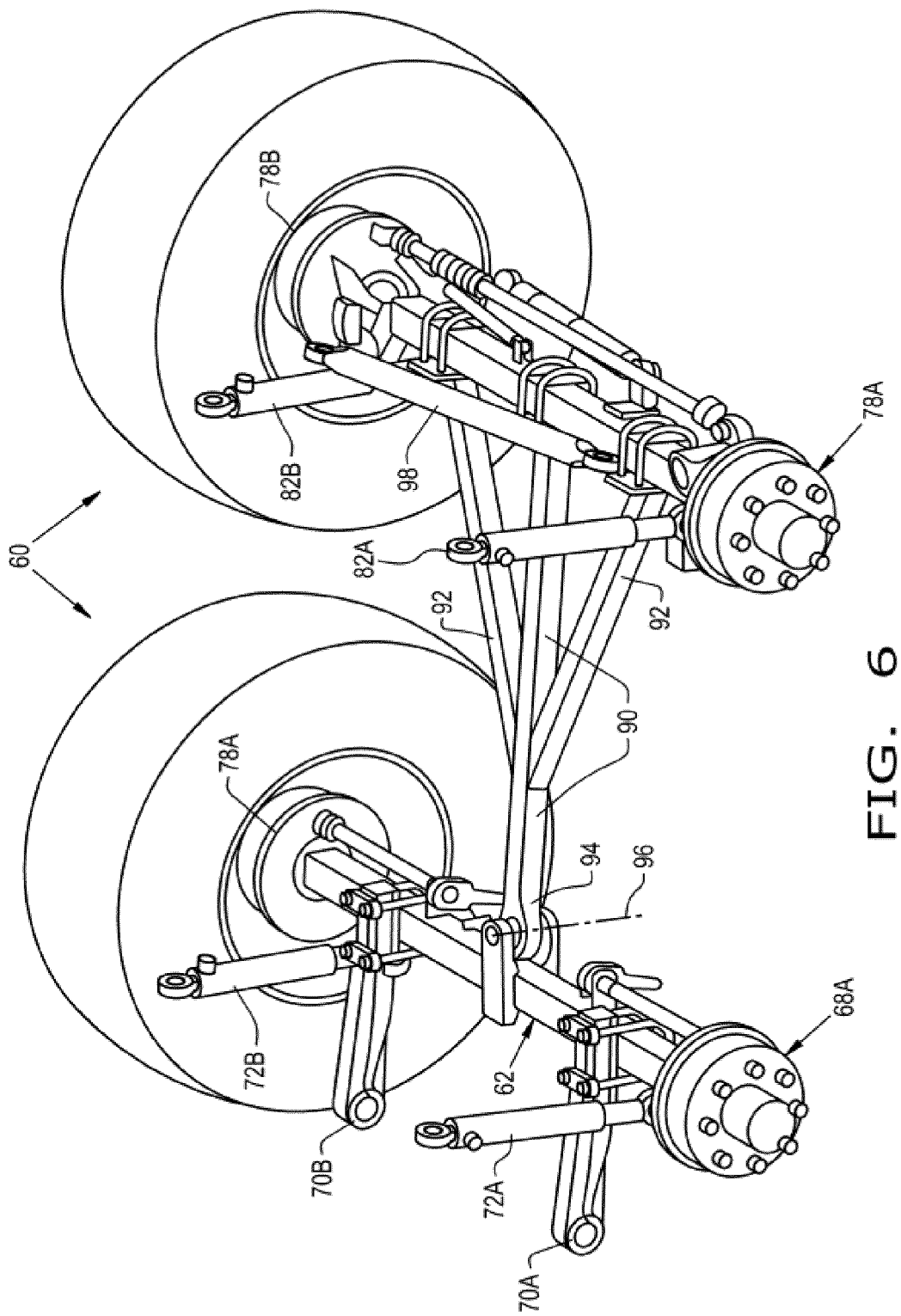
FIG. 6 is another perspective view of the axle arrangement shown in FIG. 5.
Figure 7:
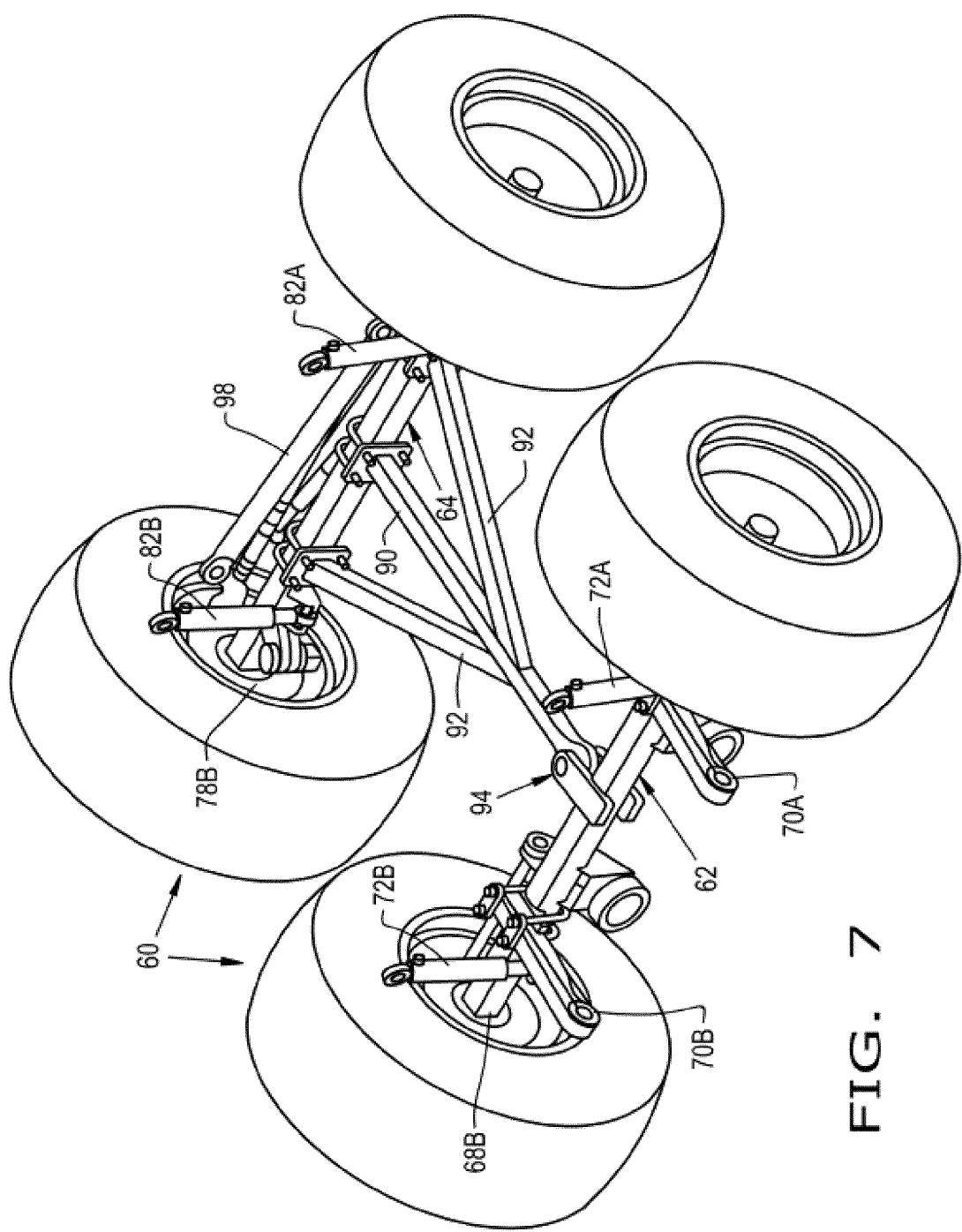
FIG. 7 is another perspective view of the axle arrangement shown in FIGS. 5 and 6, with all of the wheels installed on the respective axles.

Referring now to FIG. 4, the arcuate travel path of the needle arrangement 66 can be seen, which basically corresponds to the unusable area under the baler 10 that can interfere with the configuration of the axle arrangement 60. The needle arrangement 66 includes a needle yoke 100 which pivots during operation along and under the baler 10. The at least one elongate member 90 which interconnects the first and second axles 62 and 64, and takes up the horizontal loading on the second axle 64, is positioned below the travel path of the needle yoke 100.

In the embodiment shown and described above, the axle arrangement 60 is in the form of a tandem axle arrangement, including the first axle 62 and the second axle 64. The first axle 62 is configured as the front axle, and the second axle 64 is configured as the rear axle. However, it may be possible to configure the axle arrangement of the present invention with more than two axles. For example, it may be possible to configure the axle arrangement of the present invention with 3 axles, with the third axle coupled to the second axle by way of another elongate member 90 and braces 92 interconnecting the third axle (not shown) with the second axle 64 to accommodate generally horizontal loads on the third axle. Thus, the concepts of the present invention can be extended to an axle arrangement with two or more axles.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler, comprising:
a chassis;
a main bale chamber carried by the chassis; and
an axle arrangement coupled with the chassis, the axle arrangement including:
a first axle having opposite ends and a pair of suspension cylinders, each said suspension cylinder positioned at a corresponding said end of said first axle to accommodate generally vertical loads, the first axle being coupled with the chassis to accommodate generally horizontal loads; and
a second axle having opposite ends and a pair of suspension cylinders, each said suspension cylinder positioned at a corresponding said end of said second axle to accommodate generally vertical loads, the second axle being coupled with the first axle to accommodate generally horizontal loads, wherein the axle arrangement further includes at least one elongate member interconnecting the second axle with the first axle, wherein the at least one elongate member comprises a tube extending between the second axle and the first axle, and wherein the axle arrangement further includes a pair of angled braces, each said brace extending from the tube toward a respective one of the ends of the second axle, thereby forming a generally triangular shaped reinforcement structure.

2. An agricultural baler, comprising:
a chassis;
a main bale chamber carried by the chassis; and
an axle arrangement coupled with the chassis, the axle arrangement including:
a first axle having opposite ends and a pair of suspension cylinders, each said suspension cylinder positioned at a corresponding said end of said first axle to accommodate generally vertical loads, the first axle being coupled with the chassis to accommodate generally horizontal loads;

a second axle having opposite ends and a pair of suspension cylinders, each said suspension cylinder positioned at a corresponding said end of said second axle to accommodate generally vertical loads, the second axle being coupled with the first axle to accommodate generally horizontal loads, wherein the axle arrangement further includes at least one elongate member interconnecting the second axle with the first axle; and a needle yoke which pivots during operation along an arcuate travel path under the baler, wherein the at least one elongate member is positioned below the travel path of the needle yoke.

3. An agricultural baler comprising:
a chassis;
a main bale chamber carried by the chassis; and
an axle arrangement coupled with the chassis, the axle arrangement including:
 a first axle having opposite ends and a pair of suspension cylinders, each said suspension cylinder positioned at a corresponding said end of said first axle to accommodate generally vertical loads, the first axle being coupled with the chassis to accommodate generally horizontal loads;
 a second axle having opposite ends and a pair of suspension cylinders, each said suspension cylinder positioned at a corresponding said end of said second axle to accommodate generally vertical loads, the second axle being coupled with the first axle to accommodate generally horizontal loads; and
 a pickup unit and a feeding channel for receiving crop from the pickup unit, wherein the first axle includes a pair of leaf springs positioned at the respective opposite ends of the first axle, wherein the feeding channel defines a structural member which is coupled with the chassis, and wherein the leaf springs of the first axle are pivotally coupled with the feeding channel, and thereby indirectly coupled to the chassis by way of the feeding channel.

4. The agricultural baler of claim 3, wherein the first axle is mounted rearwardly of the feeding channel, thereby lowering an effective axle height of the axle arrangement.

5. The agricultural baler of claim 3, wherein each said leaf spring is a generally horizontally arranged leaf spring.

6. The agricultural baler of claim 3, wherein each of the leaf springs provides lateral stabilization of the first axle.

7. An axle arrangement for use with an agricultural baler, the baler including a chassis and a main bale chamber carried by the chassis, the axle arrangement comprising:
 a first axle having opposite ends and a pair of suspension cylinders, each said suspension cylinder positioned at a corresponding said end of said first axle to accommodate generally vertical loads, the first axle configured to be coupled with the chassis to accommodate generally horizontal loads; and
 a second axle having opposite ends and a pair of suspension cylinders, each said suspension cylinder positioned at a corresponding said end of said second axle to accommodate generally vertical loads, the second axle being coupled with the first axle to accommodate generally horizontal loads, wherein the second axle is coupled with the first axle via a ball joint, wherein the ball joint has a generally vertical pivot axis.

8. An axle arrangement for use with an agricultural baler, the baler including a chassis and a main bale chamber carried by the chassis, the axle arrangement comprising:
 a first axle having opposite ends and a pair of suspension cylinders, each said suspension cylinder positioned at a corresponding said end of said first axle to accommodate generally vertical loads, the first axle configured to be coupled with the chassis to accommodate generally horizontal loads;
 a second axle having opposite ends and a pair of suspension cylinders, each said suspension cylinder positioned at a corresponding said end of said second axle to accommodate generally vertical loads, the second axle being coupled with the first axle to accommodate generally horizontal loads, wherein the second axle is coupled with the first axle via a ball joint; and
 a lateral stabilization member interconnected between the second axle and the chassis.

* * * * *